(12) United States Patent
Hsu et al.

(10) Patent No.: US 11,953,400 B2
(45) Date of Patent: *Apr. 9, 2024

(54) INPUT DEVICE INCLUDING IMPROVED PRESSURE SENSING UNIT DESIGN

(71) Applicant: PIXART IMAGING INC., Hsin-Chu (TW)

(72) Inventors: Che-Chia Hsu, Hsin-Chu (TW); Yu-Han Chen, Hsin-Chu (TW); Chi-Chieh Liao, Hsin-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/142,055

(22) Filed: May 2, 2023

(65) Prior Publication Data
US 2023/0266191 A1 Aug. 24, 2023

Related U.S. Application Data

(63) Continuation of application No. 17/233,806, filed on Apr. 19, 2021, now Pat. No. 11,674,862.

(51) Int. Cl.
*G01L 9/12* (2006.01)
*G01L 9/00* (2006.01)

(52) U.S. Cl.
CPC ............. *G01L 9/12* (2013.01); *G01L 9/0005* (2013.01)

(58) Field of Classification Search
None
See application file for complete search history.

(56) References Cited

U.S. PATENT DOCUMENTS 11,674,862 B2 * 6/2023 Hsu ........................... G01L 9/12
73/718

* cited by examiner

*Primary Examiner* — Brandi N Hopkins
*Assistant Examiner* — Nigel H Plumb
(74) *Attorney, Agent, or Firm* — Li & Cai Intellectual Property (USA) Office

(57) ABSTRACT

A pressure sensing unit is provided. The pressure sensing unit includes a membrane and a pressure sensing pad group. The membrane has a first surface and a second surface. The pressure sensing pad group includes a first pressure sensing pad, a second pressure sensing pad, and a ground pad that are spaced apart from one another. The ground pad and one among the first pressure sensing pad and the second pressure sensing pad are located at the first surface of the membrane, another one among the first pressure sensing pad and the second pressure sensing pad is located at the second surface of the membrane, and an orthographic projection of the ground pad projected onto a reference plane is located between orthographic projections of the first pressure sensing pad and the second pressure sensing pad that are projected onto the reference plane. Therefore, a signal-to-noise ratio can be increased and an erroneous detection can be prevented.

10 Claims, 14 Drawing Sheets

INPUT DEVICE INCLUDING IMPROVED PRESSURE SENSING UNIT DESIGN

CROSS-REFERENCE TO RELATED PATENT APPLICATION

This application is a continuation application of U.S. application Ser. No. 17/233,806, filed on Apr. 19, 2021, and entitled "INPUT DEVICE INCLUDING IMPROVED PRESSURE SENSING UNIT DESIGN", now pending, which application is incorporated herein by reference in its entirety.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a pressure sensing unit, and more particularly to a pressure sensing unit for detecting pressing events.

BACKGROUND OF THE DISCLOSURE

Keyboards are widely used in cooperation with a computer system to serve as a user interface so that a user can operate the computer system. Taking a conventional dome-switch type keyboard as an example, when pressed, a keycap of a key pushes a rubber dome disposed beneath the keycap. The rubber dome is compressed and a tactile feedback is provided to the user. At the same time, deformation of the rubber dome causes a sensing circuit disposed below to generate a sensing signal. A chip disposed in the conventional dome-switch type keyboard receives the sensing signal from the sensing circuit and generates a code corresponding to the pressed key according to the sensing signal. The chip transmits the code to a processor of a computer, so that the processor can generate a command corresponding to the pressed key.

A touch sensitive mechanical keyboard combining both the functions of a mouse device and a traditional keyboard, has recently been developed. That is to say, the touch sensitive mechanical keyboard can operate in two or more modes, e.g., a typing mode and a mouse mode, so that the user can not only input commands but also control a cursor position in a display.

A conventional touch sensitive mechanical keyboard may include a capacitive sensing circuit that includes a plurality of pairs of sensor electrodes. Each pair of sensor electrodes defines a sensing point corresponding to one of the keys. As the key is touched or pressed by a finger of the user, a capacitance value of the sensing point changes. By detecting a variation of the capacitance value of each of the sensing points, whether the key corresponding to the sensing point is pressed or touched can be determined.

When the finger approaches an outer surface of the key without pressing down on the key, the capacitance value of the sensing point corresponding to the key will change, which may generate noise in the sensing signal. In addition, since a pressed distance resulting from pressure from the finger of the user is limited, two capacitance values of the same sensing point, which are respectively detected under situations where the key is in a touched state and a pressed state, have a smaller difference. Accordingly, for a conventional capacitive keyboard, it is difficult for the chip to determine whether the key is pressed or only touched according to the variation of the capacitance value received, which may easily result in erroneous detection.

SUMMARY OF THE DISCLOSURE

In response to the above-referenced technical inadequacies, the present disclosure provides a pressure sensing unit, a capacitive hybrid sensor device, and an input apparatus using the same, so as to increase signal-to-noise ratio and prevent erroneous detection.

In one aspect, the present disclosure provides a pressure sensing unit for detecting pressing events including a pressure sensing pad group and a floating conductive element. The pressure sensing pad group includes a first pressure sensing pad, a second pressure sensing pad, and a ground pad that are spaced apart from one another. The first pressure sensing pad and the second pressure sensing pad are electrically shielded from each other by the ground pad. One of the floating conductive element and the pressure sensing pad group is configured to be movable in a movement direction relative to another one of the floating conductive element and the pressure sensing pad group. The floating conductive element overlaps with the pressure sensing pad group in the movement direction.

In one aspect, the present disclosure provides a capacitive hybrid sensor device including at least one touch sensing unit and at least one pressure sensing unit. The at least one touch sensing unit includes a touch sensing pad group, and the touch sensing pad group includes a first touch sensing pad and a second touch sensing pad that are spaced apart from each other. The at least one pressure sensing unit includes a pressure sensing pad group and a floating conductive element. The pressure sensing pad group includes a first pressure sensing pad, a second pressure sensing pad, and a ground pad that are spaced apart from one another, and the first pressure sensing pad and the second pressure sensing pad are electrically shielded from each other by the ground pad. One of the floating conductive element and the pressure sensing pad group is configured to be movable in a movement direction relative to another one of the floating conductive element and the pressure sensing pad group, and the floating conductive element overlaps with the pressure sensing pad group in the movement direction.

In one aspect, the present disclosure provides an input apparatus including a plurality of capacitive hybrid sensor devices and a processing circuit. Each of the capacitive hybrid sensor devices includes at least one touch sensing unit and at least one pressure sensing unit. The at least one touch sensing unit includes a touch sensing pad group, and the touch sensing pad group includes a first touch sensing pad and a second touch sensing pad that are spaced apart from each other. The at least one pressure sensing unit includes a pressure sensing pad group and a floating conductive element. The pressure sensing pad group includes a first pressure sensing pad, a second pressure sensing pad, and a ground pad that are spaced apart from one another, and the first pressure sensing pad and the second pressure sensing pad are electrically shielded from each other by the ground pad. One of the floating conductive element and the pressure sensing pad group is configured to be movable in a movement direction relative to another one of the floating conductive element and the pressure sensing pad group, and the floating conductive element overlaps with the pressure sensing pad group in the movement direction. The processing circuit is electrically connected to the touch sensing pad group and the pressure sensing pad group to measure a first variation of an equivalent capacitance among the floating conductive element, the first pressure sensing pad and the second pressure sensing pad, and measure a second variation of a coupling capacitance between the first and second touch sensing pads.

Therefore, one of the advantages of the present disclosure is that in the pressure sensing unit, the capacitive hybrid sensor, and the keyboard using the same provided herein, by the technical features of "a pressure sensing pad group including a first pressure sensing pad, a second pressure sensing pad, and a ground pad that are spaced apart from one another, in which the first pressure sensing pad and the second pressure sensing pad are electrically shielded from each other by the ground pad," "one of the floating conductive element and the pressure sensing pad group being configured to be movable in a movement direction relative to another one of the floating conductive element and the pressure sensing pad group" and "the floating conductive element overlapping with the pressure sensing pad group in the movement direction," a ratio of a press signal to noise can be improved to prevent erroneous detection.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
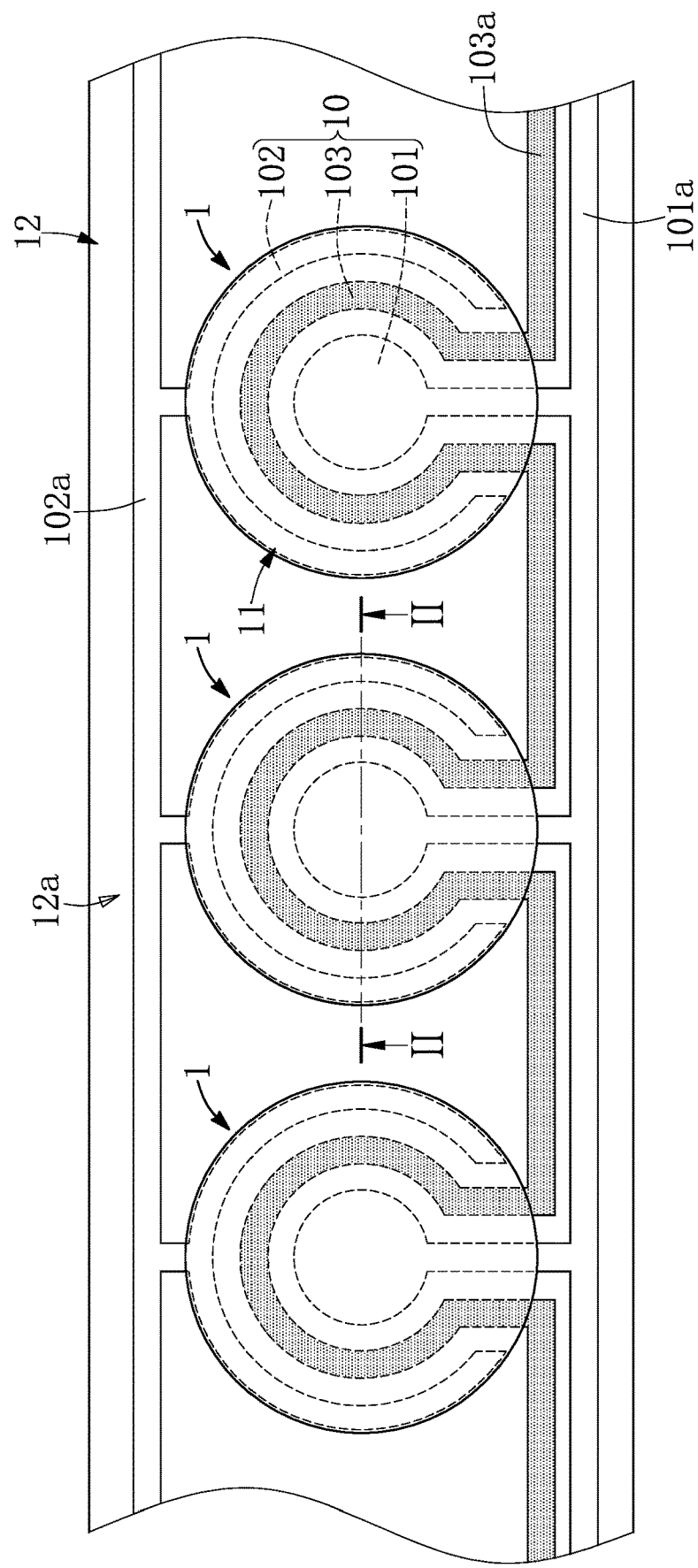
FIG. 1 is a schematic top view of a pressure sensing unit according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
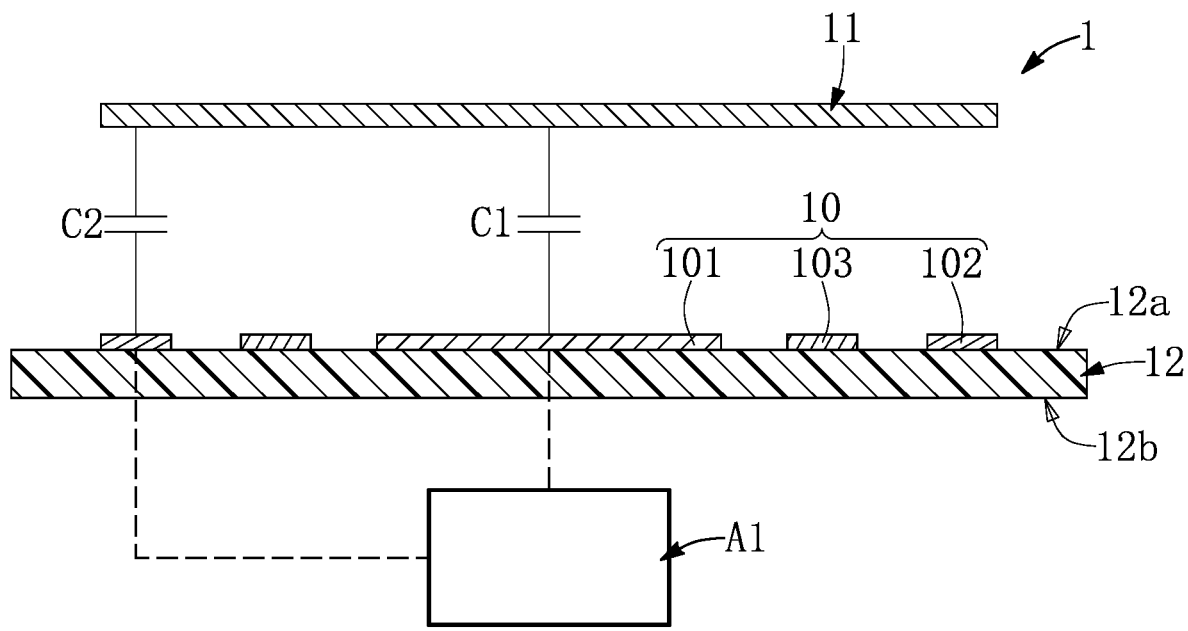
FIG. 2 is a schematic sectional view of the pressure sensing unit in a non-pressed state according to the first embodiment of the present disclosure.

Reference is made to FIG. 1 and FIG. 2. FIG. 1 is a schematic top view of a pressure sensing unit schematic sectional views of a key unit respectively in an undepressed state and a depressed state according to a first embodiment of the present disclosure. FIG. 2 is a schematic sectional view of the pressure sensing unit in a non-pressed state according to the first embodiment of the present disclosure.

The pressure sensing unit 1 provided in the embodiments of the present disclosure can be implemented in any electronic apparatus for detecting pressing events. The aforementioned electronic apparatus may be an input apparatus, such as a keyboard or a mouse, which can be electrically connected to a personal computer or integrated within the housing or chassis of another system or equipment so that a user can input commands. In one embodiment, a keyboard may include a plurality of pressure sensing units 1, and the pressure sensing units 1 are arranged to respectively correspond to the positions of keys so as to detect pressing events. Furthermore, the pressure sensing units 1 can be electrically connected to one another, as shown in FIG. 1.

Specifically, each of the pressure sensing units 1 of the instant embodiment includes a pressure sensing pad group 10 and a floating conductive element 11. One of the floating conductive element 11 and the pressure sensing pad group is configured to be movable in a movement direction relative to the other one of the floating conductive element 11 and the pressure sensing pad group 10. That is to say, if a position of the pressure sensing pad group 10 is fixed, the floating conductive element 11 will be configured to be movable in the movement direction relative to the fixed pressure sensing pad group 10, such that a shortest distance therebetween can be changed. However, if a position of the floating conductive element 11 is fixed, the pressure sensing pad group 10 will be configured to be movable in the movement direction relative to the fixed floating conductive element 11. It should be noted that the present disclosure is not limited to the aforementioned examples. In another embodiment, the floating conductive element 11 and the pressure sensing pad group 10 are configured to be movable toward or away from each other, such that the shortest distance therebetween can be changed. Accordingly, the pressure sensing unit 1 can be applied in a device for clamping an object.

As shown in FIG. 2, in the instant embodiment, the pressure sensing unit 1 further includes a membrane 12 having a first surface 12a and a second surface 12b opposite to the first surface 12a. The pressure sensing pad group 10 is disposed and fixed on a membrane 12. The membrane 12 may be a flexible circuit board so that the pressure sensing pad group 10 disposed thereon can be electrically connected to a processing circuit A1. Specifically, the flexible circuit board may have a plurality of traces (not shown in FIG. 2), and the pressure sensing pad group 10 can be electrically connected to the processing circuit A1 through the traces of the flexible circuit board. When the floating conductive element 11 approaches the pressure sensing pad group 10, such that the shortest distance or the average distance between the pressure sensing pad group 10 and the floating conductive element 11 is decreased, the pressure sensing pad group 10 is in cooperation with the processing circuit to obtain a press signal.

Reference is made to FIG. 1 again. The pressure sensing pad group 10 of the instant embodiment can include a first pressure sensing pad 101, a second pressure sensing pad 102, and a ground pad 103 that are spaced apart from one another. It should be noted that the first pressure sensing pad 101 and the second pressure sensing pad 102 are electrically shielded from each other by the ground pad 103. Specifically, an orthographic projection of the ground pad 103 onto a reference plane is located between two orthographic projections of the first and second pressure sensing pads 101, 102 onto the same reference plane.

Furthermore, the orthographic projection of the ground pad 103 onto the reference plane overlaps with neither the orthographic projection of the first pressure sensing pad 101 on the same reference plane nor the orthographic projection of the second pressure sensing pad 102 onto the same reference plane, but the present disclosure is not limited thereto. In another embodiment, the orthographic projection of the ground pad 103 onto the reference plane may partially or completely overlaps with one of the orthographic projections of the first and second pressure sensing pad 101, 102 onto the same reference plane.

As shown in FIG. 2, the first pressure sensing pad 101, the second pressure sensing pad 102, and the ground pad 103 of the instant embodiment are jointly disposed on the same surface (first surface 12a) of the membrane 12, and the ground pad 103 is disposed between the first and second pressure sensing pads 101, 102, but the present disclosure is not limited thereto. In another embodiment, the first pressure sensing pad 101, the second pressure sensing pad 102, and the ground pad 103 of the instant embodiment are jointly disposed on the second surface 12b of the membrane 12.

However, as long as a coupling capacitance between the first and second pressure sensing pads 101, 102 can be reduced as much as possible, or even approach zero, it is not necessary for the first pressure sensing pad 101, the second pressure sensing pad 102, and the ground pad 103 to be disposed the same surface.

Reference is made to FIG. 1 again. For the pressure sensing pad groups 10 (three pressure sensing pad groups 10 are exemplarily illustrated in FIG. 3), the first pressure sensing pads 101 can be electrically connected to one another through a plurality of first wires 101a. Similarly, the second pressure sensing pads 102 can be electrically connected to one another through a plurality of second wires 102a, and the ground pads 103 can be electrically connected to one another through a plurality of ground wires 103a. However, the arrangements of the first wires 101a, the second wires 102a, and the ground wires 103a are not limited to the example shown in FIG. 1.

Furthermore, as shown in FIG. 1, the first pressure sensing pad 101, the second pressure sensing pad 102, and the ground pad 103 are arranged in concentric circular shapes from the top view. Specifically, from the top view, the first pressure sensing pad 101 is in a circle shape, and the second pressure sensing pad 102 and the ground pad 103 are both in open annular shapes, and surround the firs pressure sensing pad 101. However, the present disclosure is not limited thereto. In another embodiment, the shapes of the first pressure sensing pad 101, the second pressure sensing pad 102, and the ground pad 103 may be in another geometric shapes from the top view.

Reference is made to FIG. 1 and FIG. 2. In each of the pressure sensing units 1, the floating conductive element 11 is moveably disposed above the pressure sensing pad group 10. In one embodiment, the floating conductive element 11 can be a conductive layer and directly formed on an insulating element (not shown in FIG. 2) which is supported by an elastic element (not shown in FIG. 2). The aforementioned insulating element may be a keycap, and the floating conductive element 11 can be arranged at a side of the keycap that faces toward the pressure sensing pad group 10. In another embodiment, the insulting element may be a membrane, and the floating conductive elements 11 of the plurality of pressure sensing units 1 can be formed on the membrane and arranged to an array.

In another embodiment, the floating conductive element 11 can be a conductive block that is covered by an insulating layer, and the floating conductive element 11 is disposed above the pressure sensing pad group 10 by an elastic element (not shown in FIG. 2). Accordingly, the means for moveably disposing the floating conductive element 11 above the pressure sensing pad group 10 is not limited in the present disclosure.

Furthermore, the floating conductive element 11 overlaps with the pressure sensing pad group 10 in the movement direction. Specifically, as shown in FIG. 2, the floating conductive element 11 overlaps with at least a part of the first pressure sensing pad 101 in the movement direction, and the floating conductive element 11 overlaps with at least a part of the second pressure sensing pad 102 in the movement direction. When a bias is applied to the first and second pressure sensing pads 101, 102, a first capacitor C1 with a first capacitance can be formed between the floating conductive element 11 and the first pressure sensing pad 101, and a second capacitor C2 with a second capacitance can be formed between the floating conductive element 11 and the second pressure sensing pad 102. In one embodiment, the first capacitor and the second capacitor are electrically connected to each other in parallel. Accordingly, an equivalent coupling capacitance among the floating conductive element 11, the first pressure sensing pad 101, and the second pressure sensing pad 102 may be equal to a sum of the first capacitance and the second capacitance (C1+C2).

It should be noted that since the first pressure sensing pad 101 and the second pressure sensing pad 102 are electrically shielded from each other by the ground pad 103 disposed therebetween, first pressure sensing pad 101 and the second pressure sensing pad 102 of the instant embodiment do not form any capacitor therebetween. Furthermore, in the embodiment of the present disclosure, as the shortest distance between the floating conductive element 11 and the pressure sensing pad group 10 is changed, the equivalent coupling capacitance is changed, and the processing circuit A1 that is electrically connected to the first and second pressure sensing pads 101, 102 can measure a first variation of the equivalent coupling capacitance.

Figure 3:
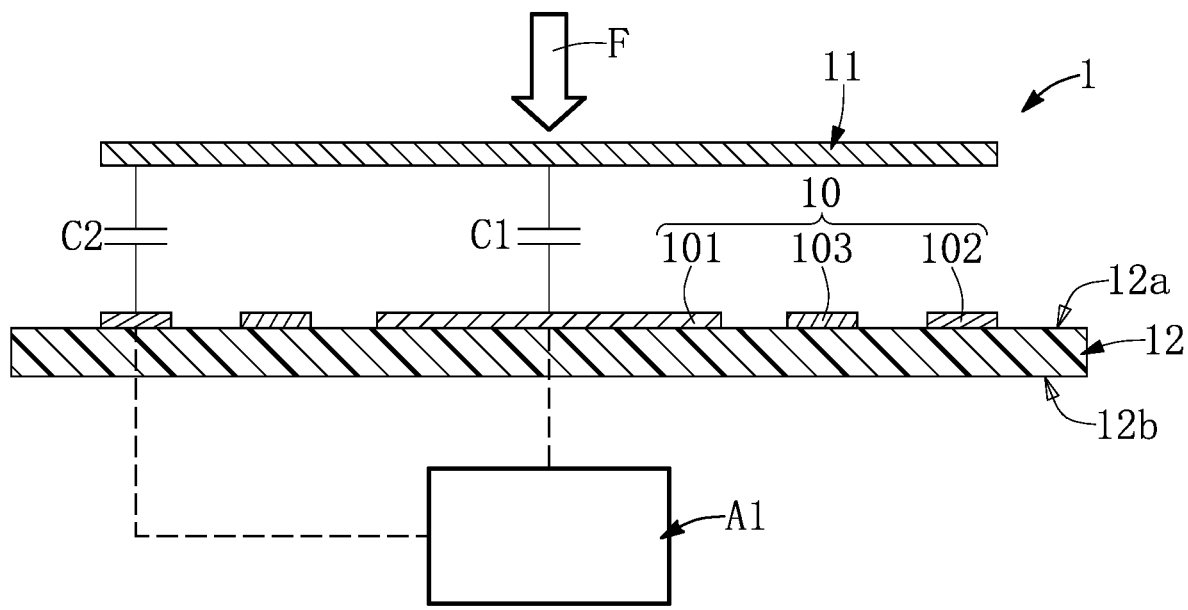
FIG. 3 is a schematic sectional view of the pressure sensing unit in a pressed state according to the first embodiment of the present disclosure.

Reference is made to FIG. 3, which is a schematic sectional view of the pressure sensing unit in a pressed state according to the first embodiment of the present disclosure. To be more specific, when the floating conductive element 11 is pressed by an external force F, the shortest distance between the floating conductive element 11 and the pressure sensing pad group 10 becomes shorter. As the shortest distance becomes shorter, the first capacitance of the first capacitor C1 and the second capacitance of the second capacitor C2 are both changed, such that the equivalent coupling capacitance is changed.

In a conventional capacitive sensing circuit, a plurality of sensing electrode pairs are arranged to respectively correspond to a plurality of sensing points. A coupling capacitance of each of the sensing electrode pairs is measured so as to determine whether the corresponding sensing point is touched or pressed. Therefore, in general, it is unlikely for the conventional capacitive sensing circuit to have a ground portion be arranged between two sensing electrodes of the sensing electrode pair; otherwise, a variation of the coupling capacitance between the two sensing electrodes of the sensing electrode pair will not be measured due to the shielding of the ground portion. Furthermore, as a grounded conductive object, such as a finger, approaches one of the sensing points, but does not touch or press the same, the coupling capacitance can vary, which may result in undesired noise.

Compared to the conventional capacitive sensing circuit, although the pressure sensing pad group 10 of the instant embodiment includes the ground pad 103 disposed between the first and second pressure sensing pads 101, 102, a variation of the equivalent coupling capacitance can still be detected when the floating conductive element 11 is pressed due to the floating conductive element 11 overlapping with the pressure sensing pad group 10.

Furthermore, in the embodiment of the present disclosure, before the floating conductive element 11 is pressed, whether the object is a conductive object or an insulator, the effects, which are caused by the object approaching the pressure sensing pad group 10, on the equivalent coupling capacitance can be significantly attenuated. Accordingly, by arranging the ground pad 103 between the first pressure sensing pad 101 and the second pressure sensing pad 102, the undesired noise can be reduced, thereby improving a signal-to-noise ratio.

Figure 4:
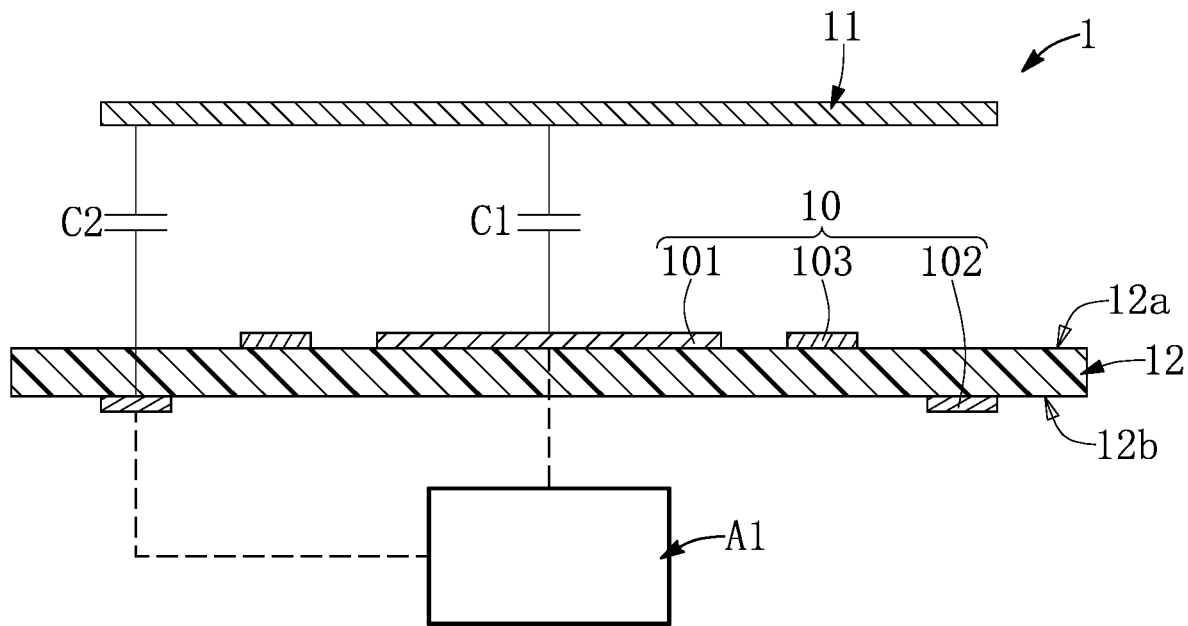
FIG. 4 is a schematic sectional view of the pressure sensing unit in a non-pressed state according to a second embodiment of the present disclosure.

Reference is made to FIG. 4, which is a schematic sectional view of the pressure sensing unit in a non-pressed state according to a second embodiment of the present disclosure. The elements of the second embodiment which are similar to or the same as those shown in FIG. 2 are denoted by similar or the same reference numerals, and will not be reiterated herein.

In the pressure sensing unit 1 shown in FIG. 4, the first pressure sensing pad 101, the second pressure sensing pad 102, and the ground pad 103 are not located at the same surface of the membrane 12. Specifically, in the instant embodiment, the first pressure sensing pad 101 and the ground pad 103 are located at the first surface 12a, and the second pressure sensing pad 102 is located at the second surface 102. However, from a top view, the first pressure sensing pad 101, the second pressure sensing pad 102, and the ground pad 103 can jointly form a pattern that is the same as the pattern illustrated in FIG. 1. That is to say, the first pressure sensing pad 101 may be in a circular shape, from the top view. Similarly, both the second pressure sensing pad 102 and the ground pad 103 may be in open annular shapes, but the present disclosure is not limited thereto.

In the instant embodiment, although the first pressure sensing pad 101 and the second pressure sensing pad 102 are respectively located at different surfaces, the orthogonal projection of the ground pad 103 onto the reference plane is still located between the two orthogonal projections of the first and second pressure sensing pads 101, 102 onto the same reference plane so that the first pressure sensing pad 101 is electrically shielded from the second pressure sensing pad 102.

Figure 5:
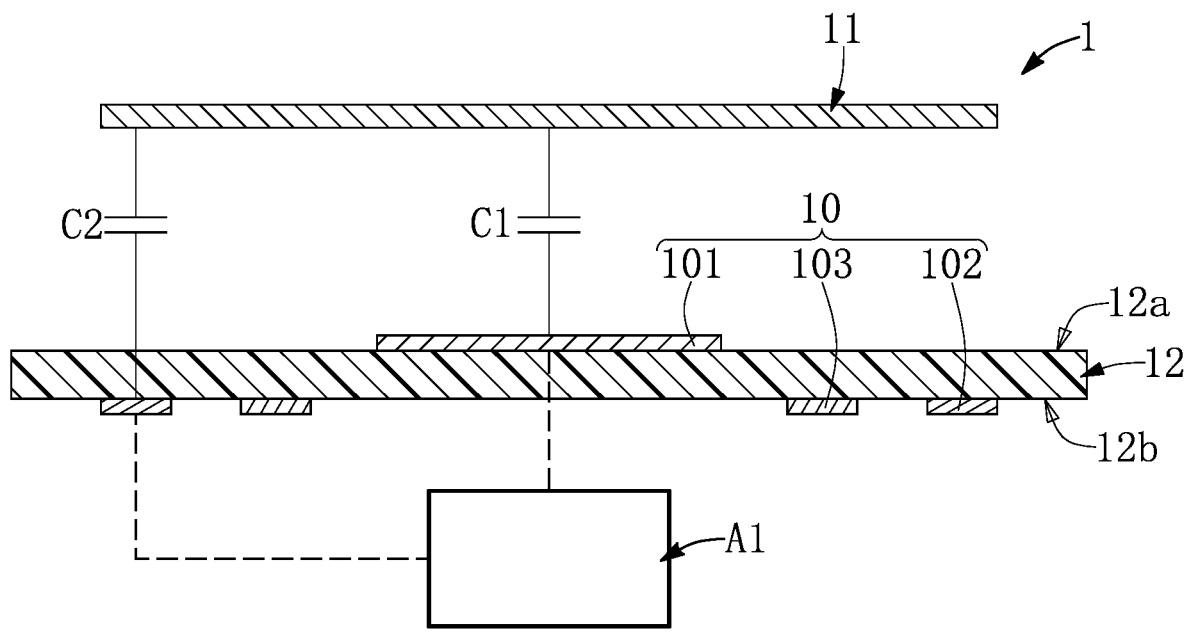
FIG. 5 is a schematic sectional view of the pressure sensing unit in a non-pressed state according to a third embodiment of the present disclosure.

Reference is made to FIG. 5, which is a schematic sectional view of the pressure sensing unit in a non-pressed state according to a third embodiment of the present disclosure. The elements of the second embodiment which are similar to or the same as those shown in FIG. 4 are denoted by similar or the same reference numerals, and will not be reiterated herein.

In the instant embodiment, the first pressure sensing pad 101 is located at the first surface 12a, and the second pressure sensing pad 102 and the ground pad 103 are jointly located at the second surface 102. As mentioned above, even though the first pressure sensing pad 101, the second pressure sensing pad 102, and the ground pad 103 are not located at the same surface, as long as the orthogonal projection of the ground pad 103 onto the reference plane is still located between the two orthogonal projections of the first and second pressure sensing pads 101, 102 onto the same reference plane, the first pressure sensing pad 101 can be electrically shielded from the second pressure sensing pad 102.

Furthermore, from the top view, the first pressure sensing pad 101, the second pressure sensing pad 102, and the ground pad 103 of the pressure sensing pad group 10 may each have another shape so that the pressure sensing pad group 10 has a pattern that is different from the pattern of the pressure sensing pad group 10 shown in FIG. 1.

Figure 6:
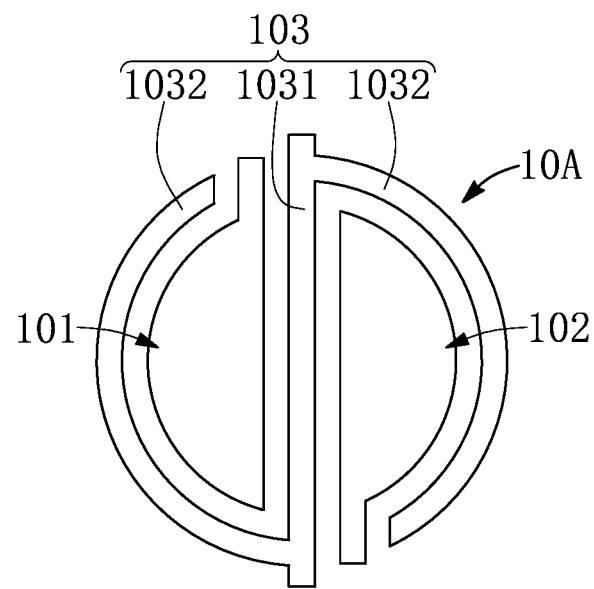
FIG. 6 is a schematic top view of a pressure sensing pad group according to one embodiment of the present disclosure.

Reference is made to FIG. 6, which is a schematic top view of a pressure sensing pad group according to one embodiment of the present disclosure. The elements of the instant embodiment which are similar to or the same as those shown in FIG. 1 are denoted by similar or the same reference numerals, and will not be reiterated herein.

In the pressure sensing pad group 10A of the instant embodiment, from the top view, both the first pressure sensing pad 101 and the second pressure sensing pad 102 are substantially in semi-circular shapes. Furthermore, the ground pad 103 includes an isolation portion 1031 and two surrounding portions 1032. The isolation portion 1031 is in a strip shape. In one embodiment, an orthogonal projection of the isolation portion 1031 onto the reference plane is located between the orthogonal projections of the first pressure sensing pad 101 and the second pressure sensing pad 102 onto the same reference plane.

Furthermore, from the top view, the two surrounding portions 1032 are respectively connected to two opposite ends of the isolation portion 1031. One of the surrounding portions 1032 surrounds the first pressure sensing pad 101, and the other one of the surrounding portions 1032 surrounds the second pressure sensing pad 102. Accordingly, the orthographic projections of the two surrounding portions 1032 onto the reference plane respectively surround the orthographic projections of the first and second pressure sensing pads 101, 102 onto the reference plane. In the instant embodiment, the two surrounding portions 1032 are both in semi-annular shapes, but the present disclosure is not limited thereto.

Figure 7:
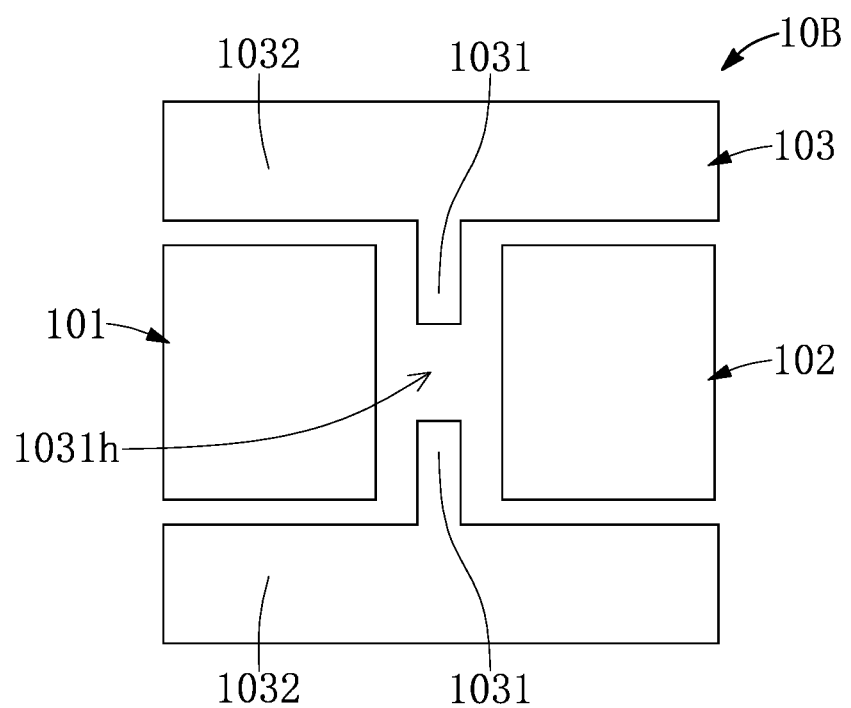
FIG. 7 is a schematic top view of a pressure sensing pad group according to one embodiment of the present disclosure.

Reference is made to FIG. 7, which is a schematic top view of a pressure sensing pad group according to one embodiment of the present disclosure. The elements of the instant embodiment which are similar to or the same as those shown in FIG. 6 are denoted by similar or the same reference numerals, and will not be reiterated herein.

In the pressure sensing pad group 10B of the instant embodiment, from the top view, the first pressure sensing pad 101 and the second pressure sensing pad 102 are both in substantially quadrilateral shapes. The ground pad 103 includes the isolation portion 1031 and the two surrounding portions 1032.

It is worth mentioning that the isolation portion 1031 of the instant embodiment has a channel 1031h so that a portion of the first pressure sensing pad 101 and a portion of the second pressure sensing pad 102 jointly form a coupling capacitor. That is to say, in the instant embodiment, the first pressure sensing pad 101 and the second pressure sensing pad 102 are partially shielded from each other by the isolation portion 1031 of the ground pad 103.

It should be noted that compared to a situation where the first pressure sensing pad 101 is not electrically shielded from the second pressure sensing pad 102, the coupling capacitor between the first pressure sensing pad 101 and the second pressure sensing pad 102, which are partially shielded from each other, has a smaller coupling capacitance.

Furthermore, in the instant embodiment, from the top view, each of the surrounding portions 1032 partially surrounds the first pressure sensing pad 101 and the second pressure sensing pad 102. Specifically, the two surrounding portions 1032 are respectively located at two opposite sides of the channel 1031h and connected to two opposite ends of the isolation portion 1031. Furthermore, each of the surrounding portions 1032 is in a strip shape and extends from a position near to a side of the first pressure sensing pad 101 to another position near to a side of the second pressure sensing pad 102.

Figure 8:
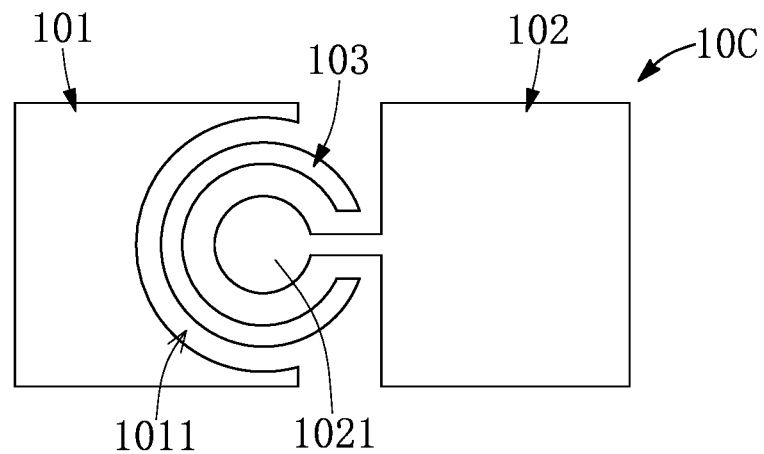
FIG. 8 is a schematic top view of a pressure sensing pad group according to one embodiment of the present disclosure.

Reference is made to FIG. 8, which is a schematic top view of a pressure sensing pad group according to one embodiment of the present disclosure. The elements of the instant embodiment which are similar to or the same as those shown in FIG. 6 are denoted by similar or the same reference numerals, and will not be reiterated herein.

In the pressure sensing pad group 10C of the instant embodiment, from the top view, the first pressure sensing pad 101 and the second pressure sensing pad 102 are both in substantially quadrilateral shapes. It should be noted that the first pressure sensing pad 101 has a concave portion 1011 that is recessed from a side nearest to the second pressure sensing pad 102. The second pressure sensing pad 102 has a protrusion portion 1021 protruding from a side nearest to the first pressure sensing pad 101. The protrusion portion 1021 extends toward the first pressure sensing pad 101 and complements the concave portion 1011 in shape. As shown in FIG. 8, the protrusion portion 1021 of the second pressure sensing pad 102 is received in a space defined by the concave portion 1011 of the first pressure sensing pad 101.

From the top view, the ground pad 103 is in open annular shape and located between the protrusion portion 1021 and the concave portion 1011 so as to electrically shield the first pressure sensing pad 101 from the second pressure sensing pad 102.

Figure 9:
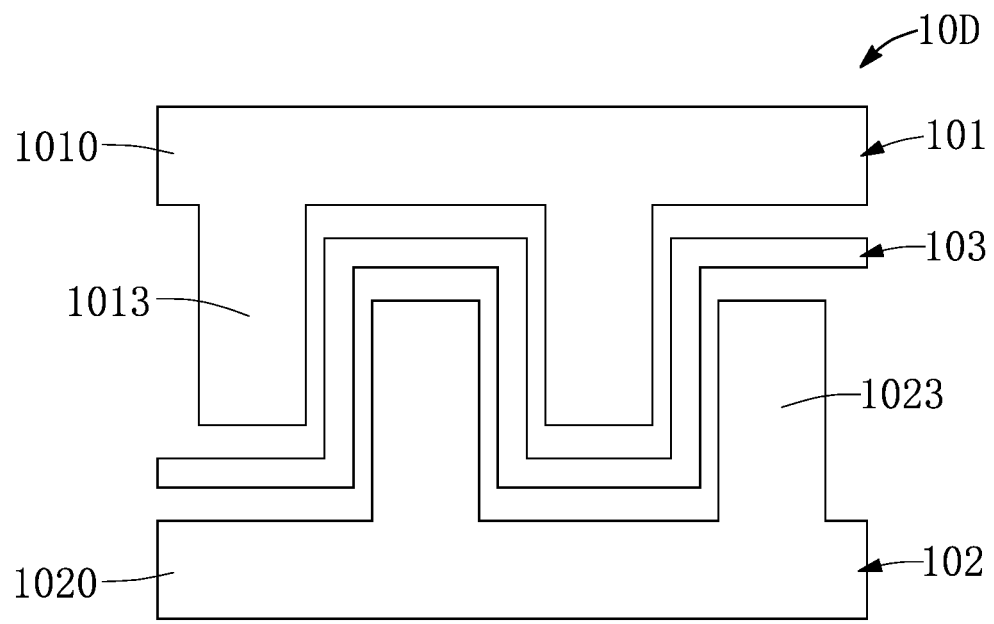
FIG. 9 is a schematic top view of a pressure sensing pad group according to one embodiment of the present disclosure.

Reference is made to FIG. 9, which is a schematic top view of a pressure sensing pad group according to one embodiment of the present disclosure. The elements of the instant embodiment which are similar to or the same as those shown in FIG. 6 are denoted by similar or the same reference numerals, and will not be reiterated herein.

In the pressure sensing pad group 10D of the instant embodiment, from the top view, the first pressure sensing pad 101 and the second pressure sensing pad 102 are both in a substantially comb shape. Specifically, as shown in FIG. 9, the first pressure sensing pad 101 has a first connection portion 1010 and a plurality of first finger portions 1013 connected to the connection portion 1010. The second pressure sensing pad 102 has a second connection portion 1020 and a plurality of second finger portions 1023. The first pressure sensing pad 101 and the second pressure sensing pad 102 are arranged with the first and second finger portions 1013, 1023 being interdigitated. However, the first and second finger portions 1013, 1023 are spaced apart from each other to define a gap.

Furthermore, from the top view, the ground pad 103 is in a substantially winding shape and located in the gap defined by the first and second finger portions 1013, 1023, so that the first pressure sensing pad 101 is electrically shielded from the second pressure sensing pad 102.

Accordingly, in the present disclosure, the pattern of the pressure sensing pad group is not limited to the examples provided herein, and the pressure sensing pad group can be designed according to practical requirements.

Since the equivalent coupling capacitance are mainly affected by the first capacitance of the first capacitor $C1$ (that is formed between the first pressure sensing pad 101 and the floating conductive element 11) and the second capacitance of the second capacitor $C2$ between the second sensing pad 102 and the floating conductive element 11, as long as an overlapping area between each one of the first and second pressure sensing pads 101, 102 and the floating conductive element 11 is large enough to increase the variation of the coupling capacitance, it is not necessary for adjacent sides of the first and second pressure sensing pads 101, 102 to be longer as compared to the conventional sensor electrodes. Accordingly, from the top view, each of the shapes of the first and second pressure sensing pads 101, 102 shown in FIG. 8 can be replaced with a quadrilateral shape having four straight sides, and the shape of the ground pad 103 can be replaced with a strip shape extending along the adjacent sides of the first and second pressure sensing pads 101, 102.

Figure 10:
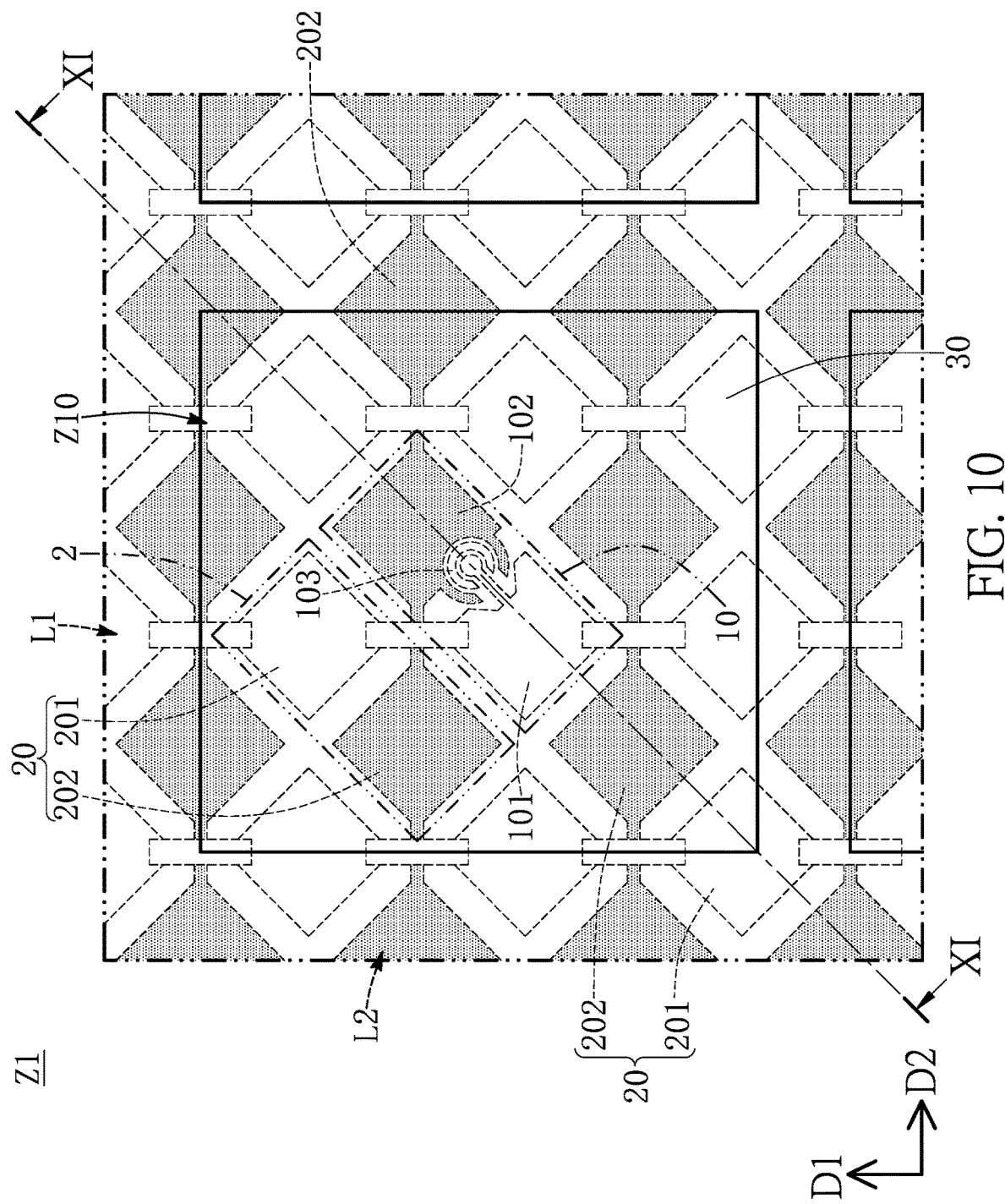
FIG. 10 is a partial schematic top view of an input apparatus according to one embodiment of the present disclosure.
Figure 11:
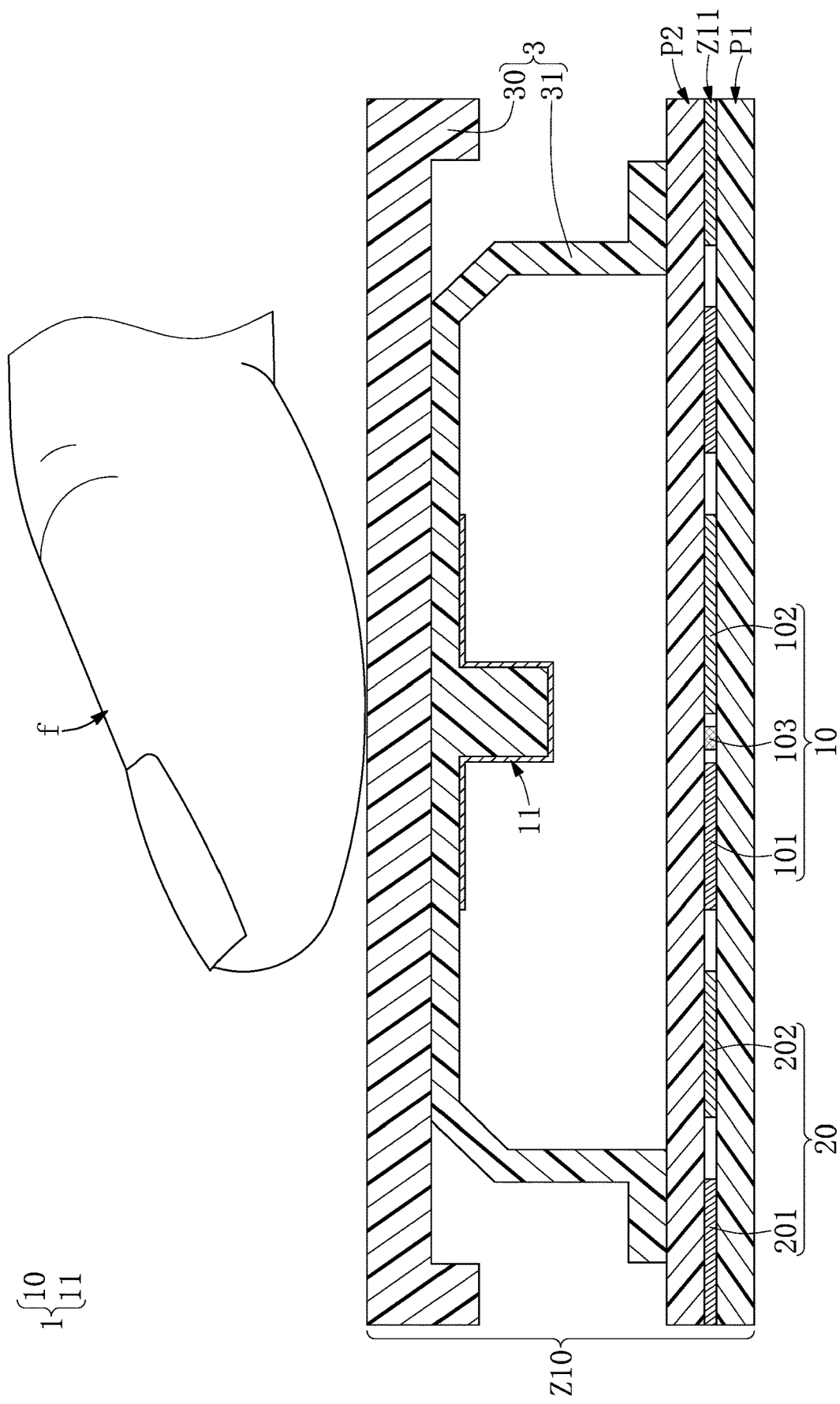
FIG. 11 is a schematic cross-sectional view of a capacitive hybrid sensor device in a non-pressed state taken along line XI-XI of FIG. 10.
Figure 12:
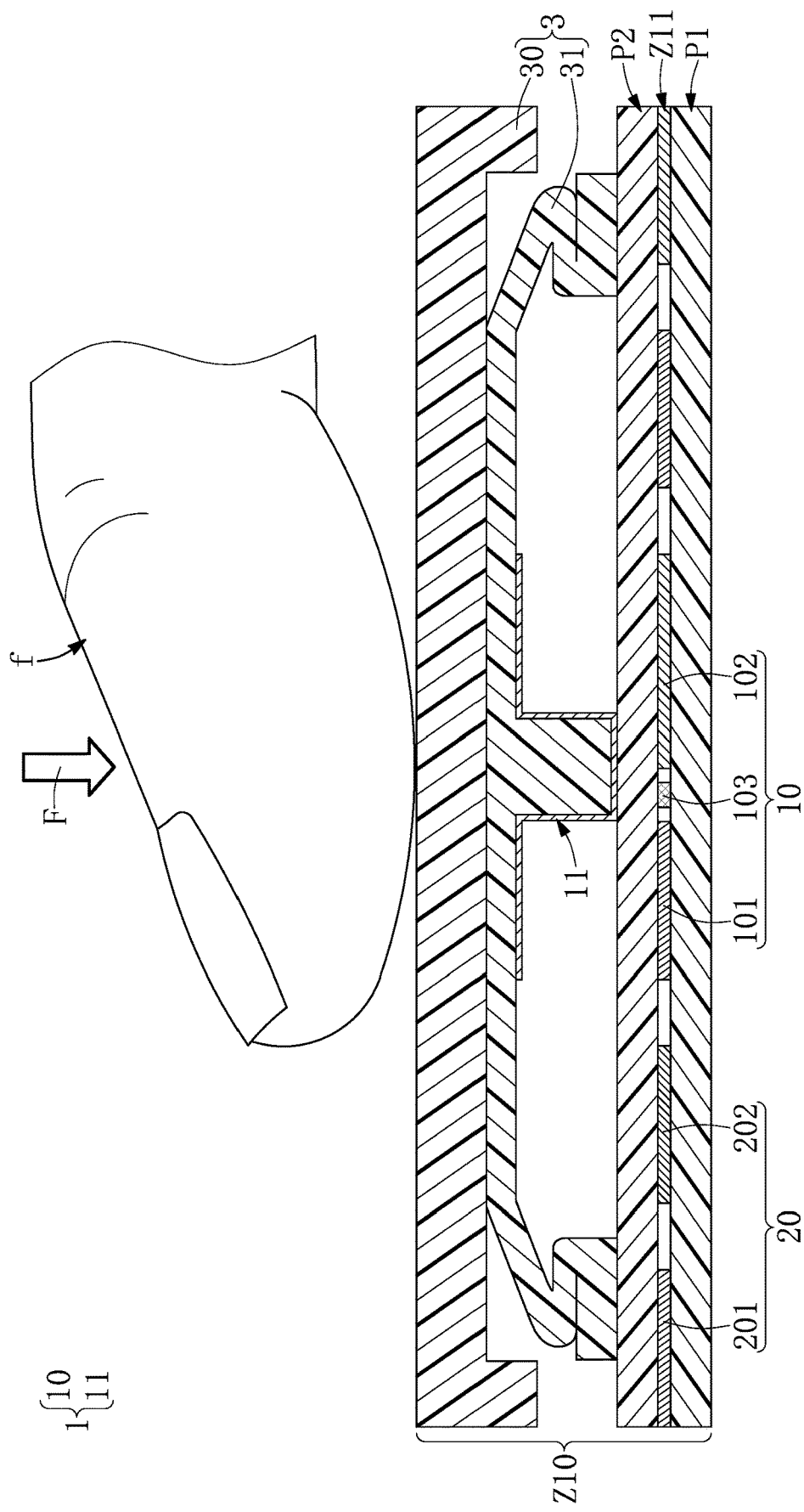
FIG. 12 is a schematic sectional view of a capacitive hybrid sensor device shown in FIG. 10 held by an object in a pressed state.

Reference is made to FIGS. 10 to 12. FIG. 10 is a partial schematic top view of an input apparatus according to one embodiment of the present disclosure, and FIG. 11 is a cross-sectional view of a capacitive hybrid sensor device in a non-pressed state taken along line XI-XI of FIG. 10. FIG. 12 is a schematic sectional view of a capacitive hybrid sensor device shown in FIG. 10 held by an object in a pressed state. The elements of the instant embodiment which are similar to or the same as those shown in FIG. 1 are denoted by similar or the same reference numerals, and will not be reiterated herein.

In one embodiment, the input apparatus can be a keyboard or a mouse. In the instant embodiment, the input apparatus Z1 is a keyboard. The input apparatus Z1 can be integrated within the housing or chassis of the computer or other device components, such as a mobile phone, electronic book, personal computer, laptop, tablet computer, stand-alone keyboard, input device, an accessory (such a tablet case with a build-in keyboard), monitor, electronic kiosk, gaming device, automated teller machine (ATM), vehicle dashboard, control panel, medical workstation, or industrial workstation. The input apparatus Z1 can be electrically coupled to or integrated in a computer system to serve as a user interface so that a user can input a command.

As shown in FIG. 10, the input apparatus Z1 includes a plurality of capacitive hybrid sensor devices Z10. It should be noted that each of the capacitive hybrid sensor devices Z10 is configured to detect pressing and touching events. In the instant embodiment, each of the capacitive hybrid sensor devices Z10 is a key device. That is to say, by the arrangements of the capacitive hybrid sensor devices Z10, a user can input commands not only by pressing but also by touching the capacitive hybrid sensor devices Z10 of the input apparatus Z1.

Referring to FIG. 11, which is to be read in conjunction with FIG. 10, each of the capacitive hybrid sensor devices Z10 includes at least one pressure sensing unit 1, at least one touch sensing unit 2, and a movable member 3.

The pressure sensing unit 1 includes a pressure sensing pad group 10 and a floating conductive element 11. The pressure sensing pad group 10 includes a first pressure sensing pad 101, a second pressure sensing pad 102, and a ground pad 103 that are spaced apart from one another. In the instant embodiment, as shown in FIG. 10, from the top view, the first pressure sensing pad 101 and the second pressure sensing pad 102 complement each other in shape and define a gap therebetween. The ground pad 103 is arranged in the gap defined by the first and second pressure sensing pads 101, 102 so as to electrically shield the first pressure sensing pad 101 from the second pressure sensing pad 102. It should be noted that a pattern of the pressure sensing pad group 10 from the top view can be replaced with any one of the embodiments shown in FIGS. 1 and 6-9, and the present disclosure is not limited to the example shown in FIG. 10.

As shown in FIG. 11 and FIG. 12, the pressure sensing pad group 10 can be disposed between a circuit board P1 and an insulating layer P2, but the present disclosure is not limited thereto. The ground pad 103 can be grounded through the traces (not shown in FIG. 11) embedded in the circuit board P1, but the present disclosure is not limited thereto.

Furthermore, the floating conductive element 11 is moveably disposed above the pressure sensing pad group 10. To be more specific, the floating conductive element 11 is a conductive layer and disposed on the movable member 3. Accordingly, a shortest distance between the floating conductive element 11 and the pressure sensing pad group 10 can be changed according to a movement of the movable member 3.

The movable member 3 of the instant embodiment includes a keycap 30 and an elastic element 31. The elastic element 31 is disposed on the insulating layer P2. In one embodiment, the elastic element 31 is compressible and resilient. The elastic element 31 is connected between the insulating layer P2 and the keycap 30, such that the keycap 30 can be moveably disposed on the pressure sensing pad group 10. That is to say, the keycap 30 can moves between a normal position and a depressed position with respect to the insulating layer P2.

It should be noted that as long as the keycap 30 can be maintained at a certain level relative to the insulating layer P2, the structure of the elastic element 31 is not limited to the example provided herein. For example, the elastic element 31 can be a rubber dome or a metallic dome.

In one embodiment, each of the capacitive hybrid sensor devices Z10 further includes a supporting structure (not shown in FIG. 11) disposed between the keycap 30 and the insulating layer P2. Moreover, the supporting structure can be a scissors-shaped frame, and the elastic element 31 is disposed in the scissors-shaped frame. As such, the direction of movement of the keycap 30 can be limited to a thickness direction of the insulating layer P2. However, the present disclosure is not limited thereto.

As shown in FIG. 11, in the instant embodiment, the floating conductive element 11 is formed on the elastic element 31 and overlaps with the pressure sensing pad group 10 in the movement direction of the movable member 3. It should be noted that, in the instant embodiment, the floating conductive element 11 does not overlap with the touch sensing pad group 20 in the movement direction. However, the present disclosure is not limited thereto. In another embodiment, the floating conductive element 11 can be formed on an inner surface of the keycap 30. Furthermore, the floating conductive element 11 may partially overlap the touch sensing pad group 20.

As mentioned previously, the floating conductive element 11 overlaps with at least a part of the first pressure sensing pad 101 in the movement direction to form a first capacitor with a first capacitance. Furthermore, the floating conductive element 11 overlaps with at least a part of the second pressure sensing pad 102 in the movement direction to form a second capacitor with a second capacitance. It should be noted that since the first pressure sensing pad 101 and the second pressure sensing pad 102 are electrically shielded from each other by the ground pad 103 disposed therebetween, first pressure sensing pad 101 and the second pressure sensing pad 102 of the instant embodiment do not form any capacitor therebetween. Accordingly, an equivalent coupling capacitance among the floating conductive element 11, the first pressure sensing pad 101, and the second pressure sensing pad 102 is mainly related to the first capacitance and the second capacitance.

As shown in FIG. 11 again, when the keycap 30 is only touched, but not pressed, by an object f (such as a finger or a conductive object), since the shortest distance between the floating conductive element 11 and the pressure sensing pad group 10 is not changed, the equivalent coupling capacitance is only slight changed or even unchanged. In other words, the equivalent coupling capacitance is only slightly affected or even not affected by a distance between the object f and the keycap 30. Accordingly, as long as the keycap 30 is not pressed, even if the object f touches the keycap 30, a first variation of the equivalent coupling capacitance can approach zero. Therefore, the first variation of the equivalent coupling capacitance for determining whether the keycap 30 is pressed can be prevented from being interfered by the noise resulting from the object f getting close to or being in contact with the keycap 30.

Referring to FIG. 12, when the keycap 30 is pressed by the object f, an external force F is applied to the keycap 30 and forces the elastic element 31 to be deformed such that the shortest distance between the floating conductive element 11 and the pressure sensing pad group 10 is reduced. As such, the first capacitance between the floating conductive element 11 and the first pressure sensing pad 101 and the second capacitance between the floating conductive element 11 and the second pressure sensing pad 102 are both changed, thereby changing the equivalent coupling capacitance.

Reference is made to FIG. 10 and FIG. 11 again. The at least one touch sensing unit 2 includes a touch sensing pad group 20. The touch sensing pad group 20 includes a first touch sensing pad 201 and a second touch sensing pad 202 that are spaced apart from each other so as to define a touch sensing position. That is to say, when a user touches, but does not press, the touch sensing position of keycap 30 with the object f, a coupling capacitance between the first and second touch sensing pads 201, 202 can be changed. Accordingly, by measuring a second variation of the coupling capacitance between the first and second touch sensing pads 201, 202, whether the keycap 30 is touched or not can be determined.

Referring to FIG. 10, it should be noted that the first touch sensing pad 201 and the first pressure sensing pad 101 are arranged in a first direction D1 and electrically connected to each other so as to form a first electrode line L1. Furthermore, the second touch sensing pad 202 and the second pressure sensing pad 102 are arranged in a second direction D2 and electrically connected to each other to form a second electrode line L2. The first electrode line L1 and the second electrode line L2 jointly form a sensing circuit, which is not denoted by any reference numeral in FIG. 10.

As shown in FIG. 10, each of the capacitive hybrid sensor devices Z10 further includes a plurality of first touch sensing pads 201 and a plurality of second touch sensing pads 202. The first touch sensing pads 201, the second touch sensing pads 202, the first pressure sensing pad 101, and the second pressure sensing pad 102 can be arranged in an array. The first touch sensing pads 201 and the second touch sensing pads 202 can be arranged to surround the pressure sensing pad group 10 so as to define a plurality of touch sensing positions. It should be noted that each of the keycaps 30 of the capacitive hybrid sensor devices Z10 can correspond to multiple touch sensing positions.

Figure 13:
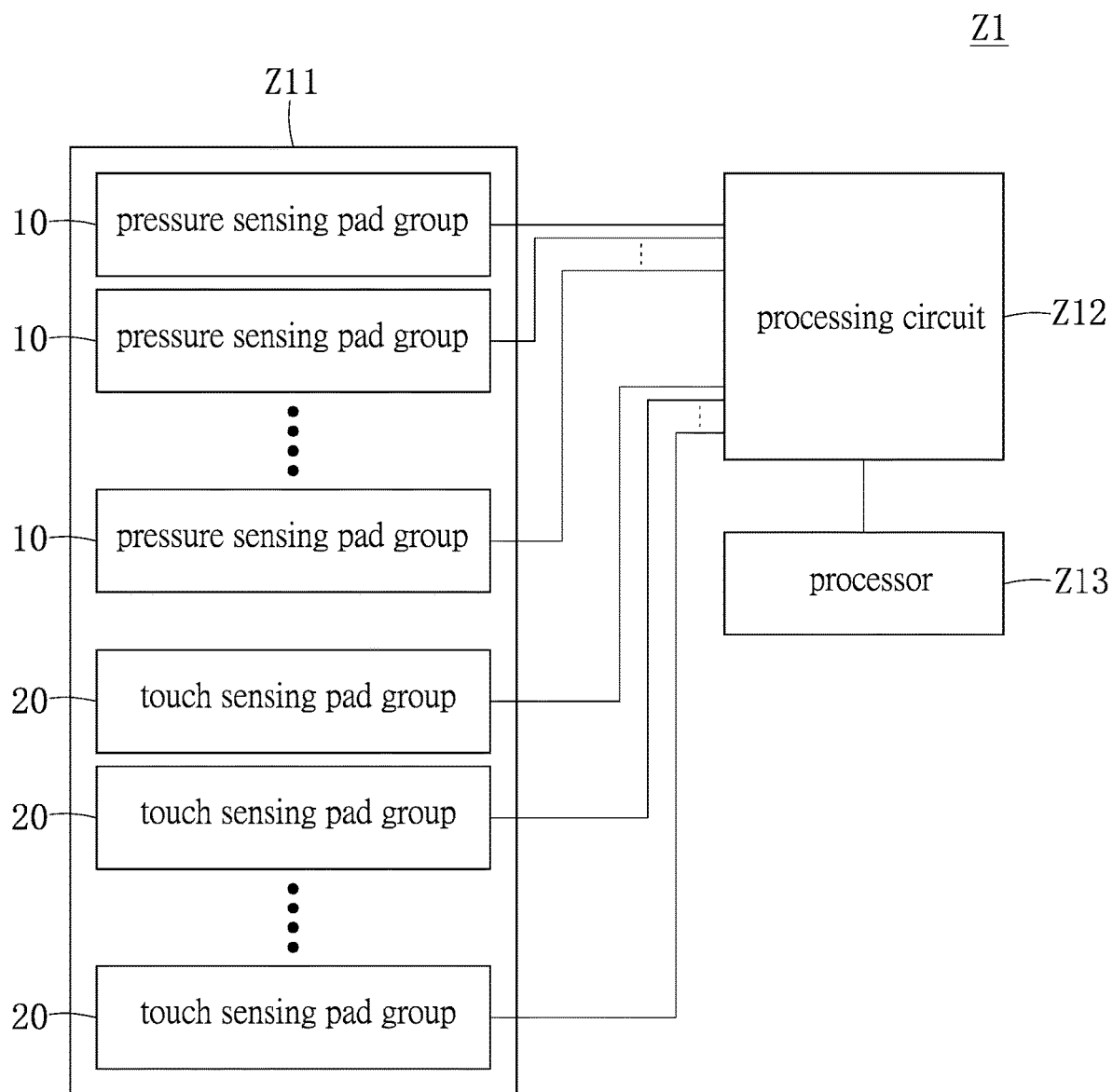
FIG. 13 is a functional block diagram of the input apparatus according to the embodiment of the present disclosure.

Reference is made to FIG. 13, which is to be read in conjunction with FIG. 11 and FIG. 12. FIG. 13 is a functional block diagram of the input apparatus according to the embodiment of the present disclosure. As mentioned above, the pressure sensing pad groups 10 and the touch sensing pad groups 20 jointly form the sensing circuit Z11. Furthermore, the input apparatus Z1 further includes a processing circuit Z12 and a processor Z13.

The processing circuit Z12 is electrically connected to each of the pressure sensing pad groups 10 of the capacitive hybrid sensor devices Z10 and each of the touch sensing pad groups 20 so as to measure the first variations of the equivalent coupling capacitances respectively corresponding to the pressure sensing pad groups 10, and to measure a second variation of the coupling capacitance of each of the touch sensing pad groups 20. It should be noted that in the instant embodiment, each of the keycaps 30 of the capacitive hybrid sensor devices Z10 can corresponds to one of the pressure sensing pad groups and multiple touch sensing pad groups 20.

Accordingly, the processing circuit Z12 can determine whether or not the keycap 30 is touched and determine which keycap 30 is touched according to the second variations of the coupling capacitances of the touch sensing pad groups 20. Furthermore, the processing circuit Z12 can determine whether or not the keycap 30 is pressed and determine which keycap 30 is pressed according to the first variation of the equivalent coupling capacitance.

Specifically, for each one of the capacitive hybrid sensor devices Z10, the processing circuit Z12 can measure the first variation of the equivalent capacitance and then determine whether the keycap 30 is pressed or not. When the first variation of the equivalent coupling capacitance is greater than a first threshold value, the processing circuit Z12 outputs a press signal corresponding to the keycap 30. Moreover, the processing circuit Z12 can measure the second variation of the coupling capacitance and then determine whether the keycap 30 is touched or not. When the second variation of the coupling capacitance is greater than a second threshold value, the processing circuit Z12 outputs a touch signal corresponding to the keycap 30.

It should be noted that in the instant embodiment, for a certain capacitive hybrid sensor device Z10, when both conditions, i.e., the first variation of the equivalent coupling capacitance is greater than the first threshold value and the second variation of the coupling capacitance is greater than the second threshold value, are satisfied, the processing circuit Z12 only outputs the press signal corresponding to the certain capacitive hybrid sensor device Z10 and omits the second variation of the coupling capacitance.

That is to say, once the keycap 30 is pressed, even if the processing circuit Z12 measures the second variations of the coupling capacitances of the multiple touch sensing pad groups 20 that corresponds to the pressed keycap 30, the processing circuit Z12 will not output the touch signal corresponding to the pressed keycap 30.

As shown in FIG. 13, the processor Z13 is electrically connected to the processing circuit Z12 to receive state information of each of the capacitive hybrid sensor devices Z10. In one embodiment, the processor Z13 can be a programmable logic controller, a logic circuit, a microprocessor, or any combination thereof. In this embodiment, the processor Z13 is electrically connected to the processing circuit Z12; however, in another embodiment, the processing circuit Z12 can be incorporated into the processor Z13.

After the processing circuit Z12 determines the state of the keycap 30, the processing circuit Z12 transmits the state information corresponding to the capacitive hybrid sensor device Z10 to the processor Z13, in which the state information may include an address of the capacitive hybrid sensor device Z10 and a state signal of the capacitive hybrid sensor device Z10. The state signals may be a non-contact signal, a touch signal or a press signal. In one embodiment, the state information of every one of the capacitive hybrid sensor devices Z10 can be transmitted by the same processing circuit Z12 to the processor Z13.

When one of the capacitive hybrid sensor device Z10 is in a touched state, i.e., the keycap 30 is touched but not pressed, the processing circuit Z13 transmits the address and the touch signal, both of which correspond to the touched capacitive hybrid sensor device Z10, to the processor Z13. When the capacitive hybrid sensor device Z10 is in a pressed state, the processing circuit Z12 transmits the address and the press signal, both of which correspond to the pressed capacitive hybrid sensor device Z10, to the processor Z13.

In one embodiment, the processor Z13 may be electrically connected to a control chip of a host. The processor Z13 transmits the state information corresponding to a certain capacitive hybrid sensor device Z10 to the control chip, so that the control chip can execute a program corresponding to the state information of a certain capacitive hybrid sensor device Z10.

Figure 14:
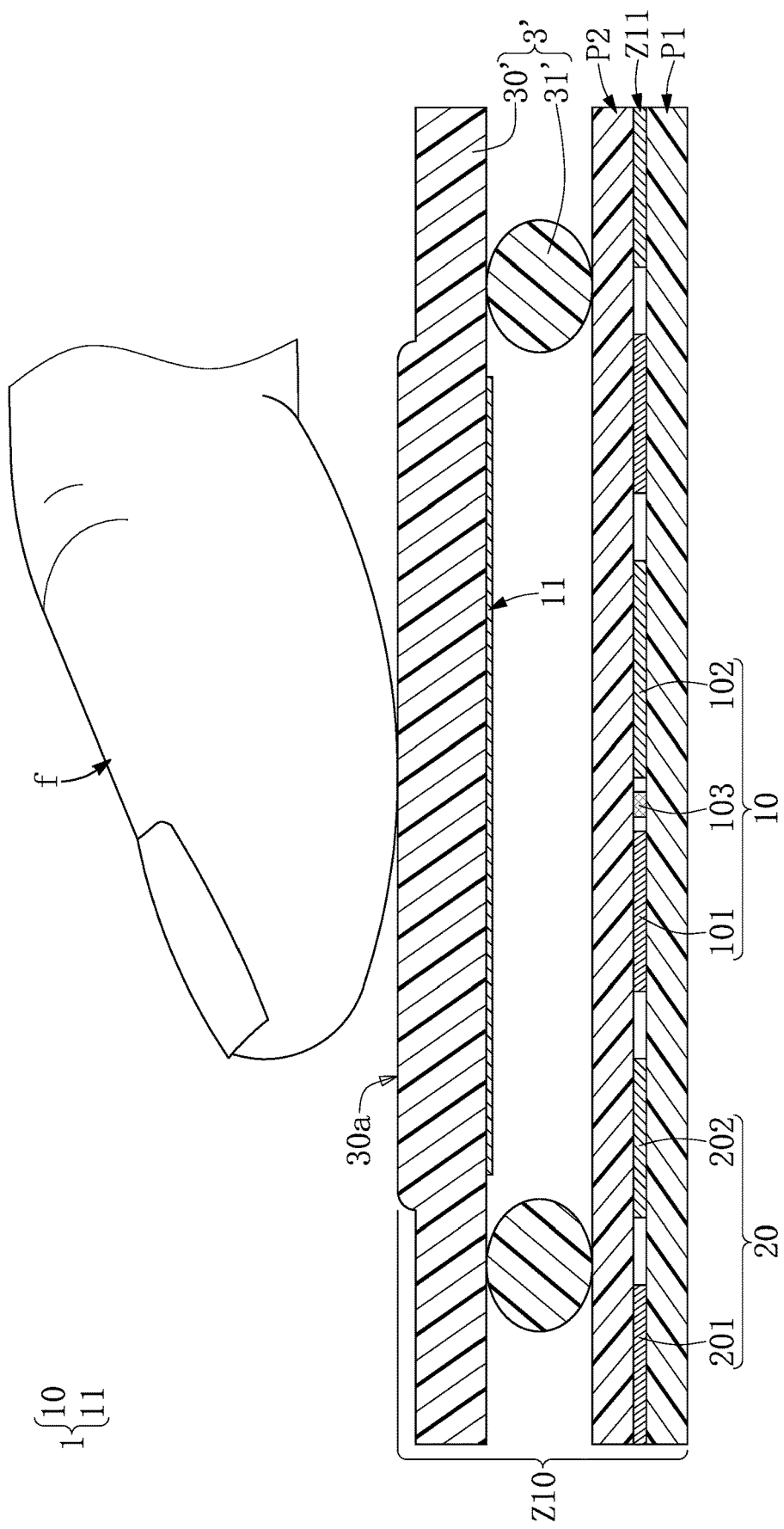
FIG. 14 is a schematic sectional view of a capacitive hybrid sensor device in a non-pressed state according to one embodiment of the present disclosure.
Figure 15:
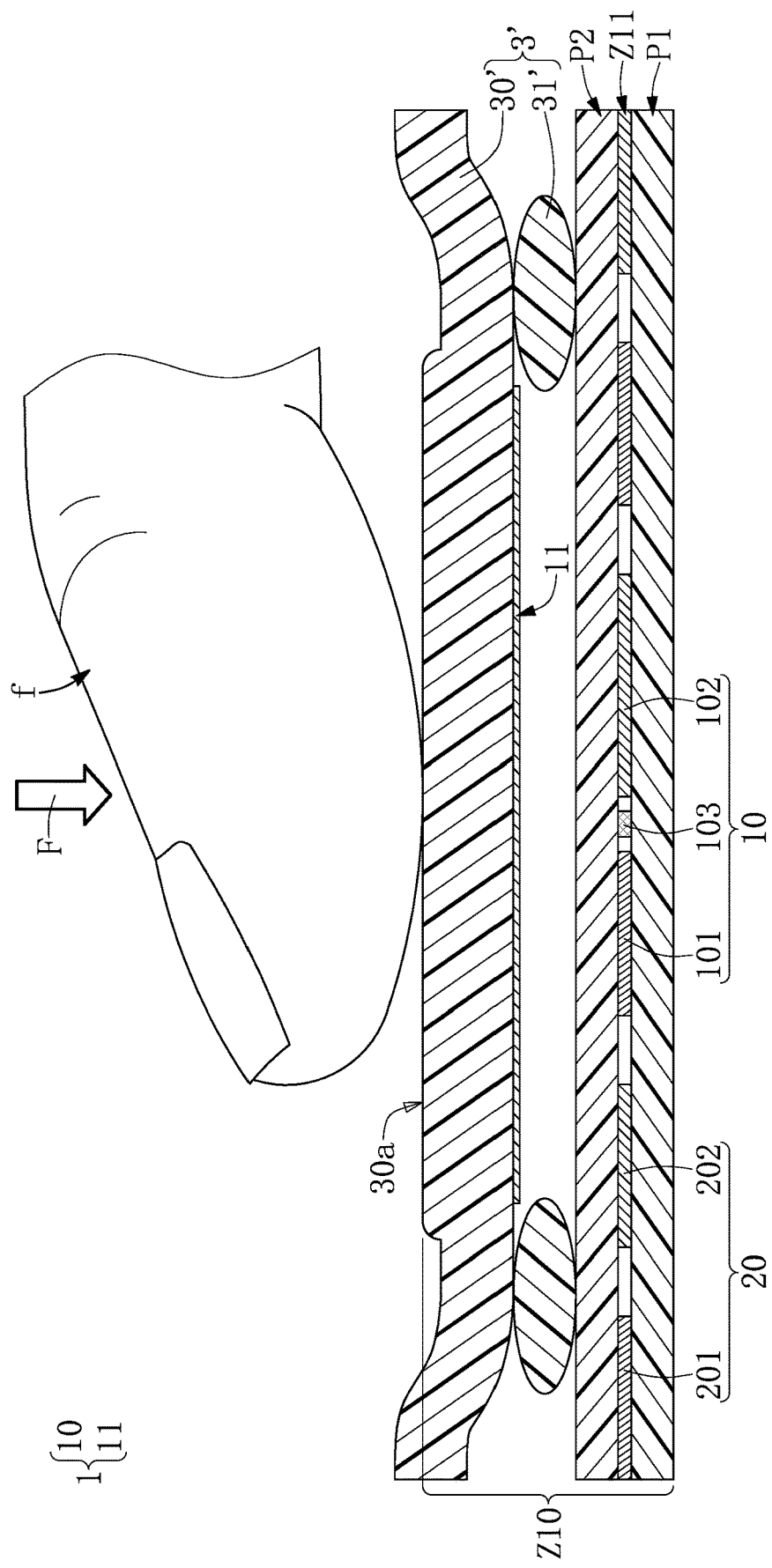
FIG. 15 is a schematic sectional view of the capacitive hybrid sensor device held by an object in the pressed state according to the embodiment of the present disclosure.

Reference is made to FIG. 14 and FIG. 15, which are schematic sectional views of a capacitive hybrid sensor device respectively in a non-pressed state and held by an object in the pressed state according to one embodiment of the present disclosure. The elements of the instant embodiment which are similar to or the same as those shown in FIG. 11 and FIG. 12 are denoted by similar or the same reference numerals, and will not be reiterated herein.

In the instant embodiment, the movable element 3' includes a flexible covering layer 30' and a spacer assembly 31'. The flexible covering layer 30' is disposed above and spaced apart from the insulating layer P2 by the spacer assembly 31'.

The flexible covering layer 30' has a protrusion region 30a, and the protrusion region 30a is in alignment with the pressure sensing pad group 10. Furthermore, the floating conductive element 11 is a conductive layer, and the floating conductive element 11 is disposed on a surface of the flexible covering layer 30' and faces toward the insulating layer P2.

The spacer assembly 31' is disposed between the flexible covering layer 30' and the insulating layer P2 to allow the flexible covering layer 30' to be deformed. As shown in FIG. 15, when an external force F is applied to the protrusion region 30a of the flexible covering layer 30' by the object f, both of the flexible covering layer 30' and the spacer assembly 31' are deformed, and the floating conductive element 11 located at the flexible covering layer moves downwardly along with a deformation of the flexible covering layer 30'. As such, the shortest distance between the floating conductive element 11 and the pressure sensing pad group 10 can be reduced, thereby changing the equivalent coupling capacitance among the floating conductive element 11 and the pressure sensing pad group 10.

Accordingly, similar to the embodiment shown in FIG. 13, in the instant embodiment, when the flexible covering layer 30' of the capacitive hybrid sensor device Z10 is pressed, the first variation of the equivalent coupling capacitance can be measured by the processing circuit Z12. When the flexible covering layer 30' of the capacitive hybrid sensor device Z10 is touched, but not pressed, the first variation of the equivalent coupling capacitance cannot be measured by the processing circuit Z12. In the instant embodiment, by disposing the ground pad 103 between the first and second pressure sensing pads 101, 102, the first variation of the equivalent coupling capacitance can still be attenuated when the flexible covering layer 30' is not deformed.

However, the present disclosure is not limited to the example provided herein. In another embodiment, the floating conductive element 11 can be embedded in the flexible covering layer 30' and can be deformed with the deformation of the flexible covering layer 30'.

Figure 16:
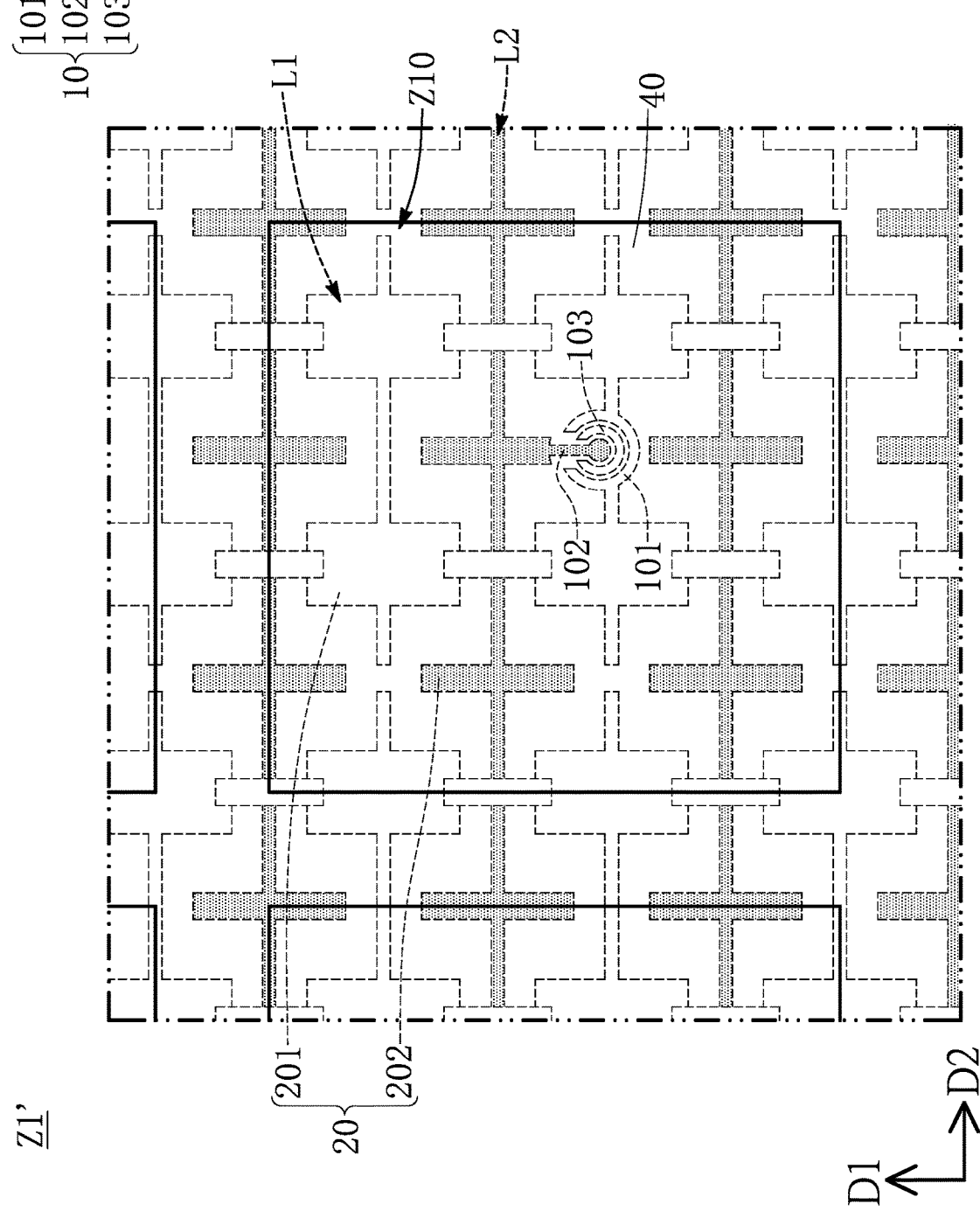
FIG. 16 is a partial schematic top view of an input apparatus according to one embodiment of the present disclosure.

Reference is made to FIG. 16, which is a partial schematic top view of an input apparatus according to one embodiment of the present disclosure. The elements of the instant embodiment which are similar to or the same as those shown in FIG. 10 are denoted by similar or the same reference numerals, and will not be reiterated herein.

In the input apparatus Z1' of the instant embodiment, from the top view, the pattern of the pressure sensing pad group 10 and the pattern of the touch sensing pad group 20 are both different from those shown in FIG. 10. Specifically, the first touch sensing pad 201 is in a substantially fence shape, and the second touch sensing pad 202 is in a strip shape, from the top view.

Specifically, the first touch sensing pad 201 has two column portions (not denoted by reference numerals) and a rail portion (not denoted by reference numerals), in which each of the column portions extends in the first direction D1, and the rail portion extends in the second direction D2 and connected to the two column portions. Furthermore, the second touch sensing pad 202 is arranged with a longitude axis thereof being in alignment with the second direction D2. From the top view, the second touch sensing pad 202 is arranged to be offset from each of the column portions in the first direction D1.

As shown in FIG. 16, the first pressure sensing pad 101 is in a fence shape that is similar to that of the first touch sensing pad 201. However, the rail portion of the first pressure sensing pad 101 has a curved section. Furthermore, the second pressure sensing pad 102 is in a strip shape that is similar to that of the second touch sensing pad 202. Compared to the second touch sensing pad 202, the second pressure sensing pad 102 further includes a protrusion section extending toward the curved section of the first pressure sensing pad 101. However, a gap is defined between the protrusion section and the curved section.

As shown in FIG. 16, from the top view, the ground pad 103 is in an open annular shape and located in the gap defined by the curved section of the first pressure sensing pad 101 and the protrusion section of the second pressure sensing pad 102.

In the instant embodiment, the first pressure sensing pad 101 and the first touch sensing pad 201 are arranged in the first direction D1 and electrically connected to each other by a bridge portion so as to form at least one first electrode line L1. Furthermore, the second pressure sensing pad 102 and the second touch sensing pad 202 are arranged in the second direction D2 and electrically connected to each other by a connection portion so as to form at least one second electrode line L2.

Figure 17:
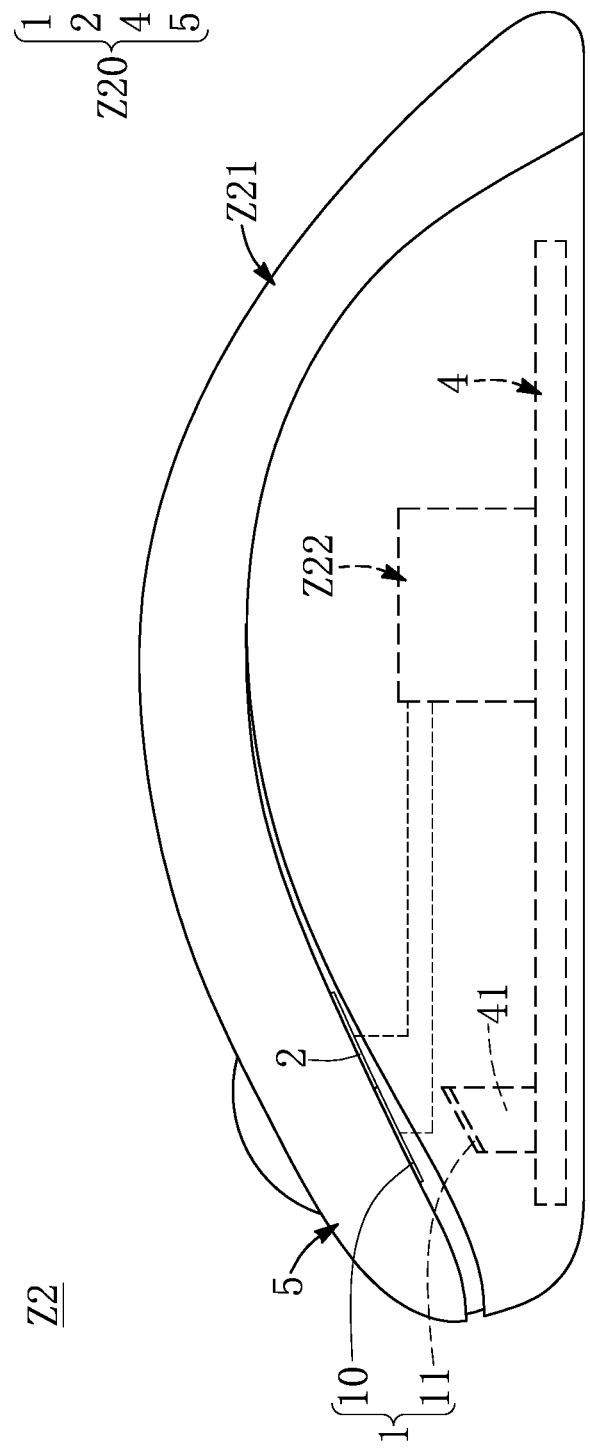
FIG. 17 is a partial schematic sectional view of a mouse with a button cap thereof in a non-pressed state according to one embodiment of the present disclosure.
Figure 18:
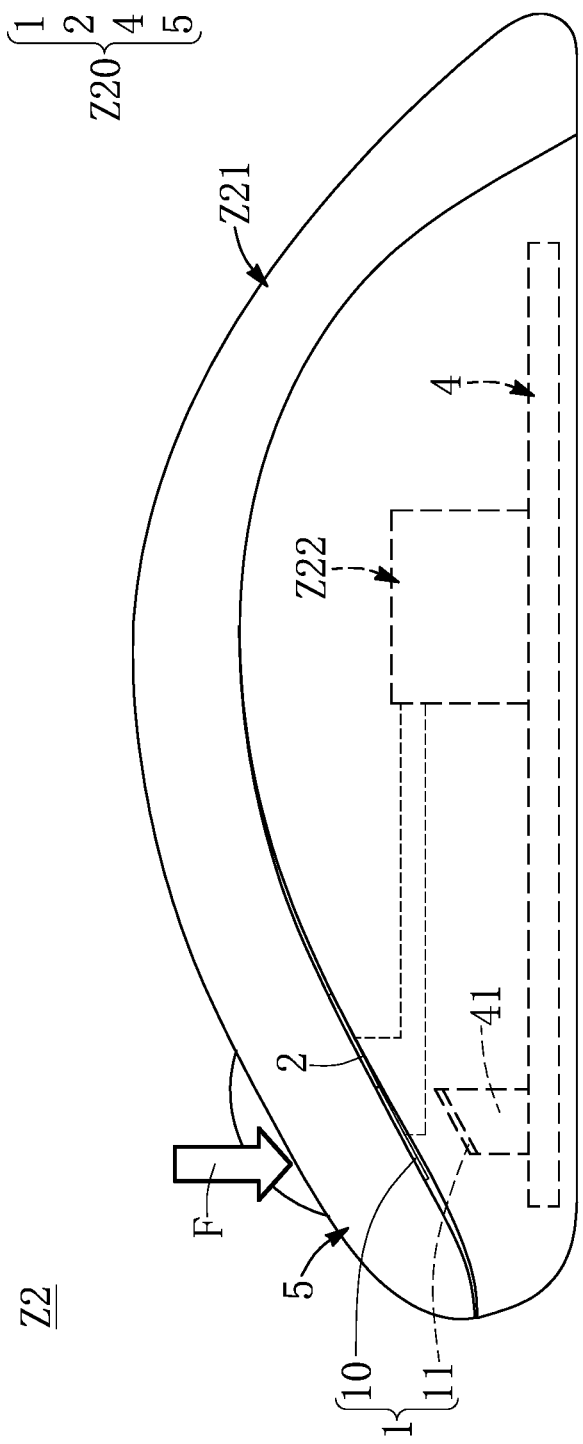
FIG. 18 is a partial schematic sectional view of the mouse with the button cap thereof being held in the pressed state according to one embodiment of the present disclosure.

Reference is made to FIG. 17 and FIG. 18. FIG. 17 and FIG. 18 are partial schematic sectional views of a mouse with a button cap thereof respectively in a non-pressed state or being held in the pressed state according to one embodiment of the present disclosure. In the instant embodiment, the input apparatus Z2 can be a mouse. The input apparatus Z2 can be electrically connected to a computer system so that a user can input commands to control the computer system through the input apparatus Z2. In the instant embodiment, the user can input commands through touching or pressing the input apparatus Z2.

Specifically the input apparatus Z2 includes a capacitive hybrid sensor device Z20, a housing Z20, and a processing circuit Z22. The housing Z21 defines an accommodating space, and the capacitive hybrid sensor device Z20 and the processing circuit Z22 are arranged in the accommodating space. Specifically, the capacitive hybrid sensor device Z20 can include at least one pressure sensing unit 1, at least one touch sensing unit 2, a substrate 4, and a button cap 5.

In the instant embodiment, the pressure sensing unit 1 includes a pressure sensing pad group 10 and a floating conductive element 11. The structure of the pressure sensing pad group 10 can be the same as or similar to any one of the structures that have been mentioned in the previous embodiments, and will not be reiterated herein. Similarly, the touch sensing unit 2 can include a plurality of touch sensing pad groups to form a plurality of touch sensing positions, and each of the touch sensing pad groups can have a structure that is the same as or similar to the structure shown in FIG. 10 or FIG. 16, but the present disclosure is not limited thereto.

In the instant embodiment, the pressure sensing pad group 10 is moveably disposed above the floating conductive element 11, and the pressure sensing pad group 10 overlaps with the floating conductive element 11 in a movement direction. Specifically, the substrate 4 includes a protruding post 41, and the floating conductive element 11 is disposed on the protruding post 41.

Furthermore, the button cap 5 has an outer surface and an inner surface opposite to the outer surface. The button cap 5 is moveably disposed above the substrate 4 with the inner surface facing toward the substrate 4. The pressure sensing pad group 10 and the touch sensing unit 2 can be jointly located on the inner surface of the button cap 5. As shown in FIG. 17, the pressure sensing pad group 10 overlaps with the protruding post 41. Similar to the abovementioned embodiments, when the button cap 5 is touched, but not pressed, by an object, only the coupling capacitance of the touch sensing unit 2 is varied. The second variations of the coupling capacitance at different touch sensing positions of the touch sensing unit 2 can be measured to determine which touch sensing position is touched. Accordingly, a user can control a motion of a cursor on the display screen by touching the outer surface of the button cap 5.

As shown in FIG. 18, when the button cap 5 is pressed by an external force F, such that a shortest distance between the pressure sensing pad group 10 and the floating conductive element 11 is reduced, an equivalent coupling capacitance between the pressure sensing pad group 10 and the floating conductive element 11 can be changed. The first variation of the equivalent coupling capacitance can be measured to determine whether or not the button cap 5 is pressed. Accordingly, the user can input another command by pressing the button cap 5 to control a computer system that is electrically connected to the input apparatus Z2.

The processing circuit Z22 can be a control chip and disposed on the substrate 4. In one embodiment, the substrate 4 can be a printed circuit board. Furthermore, the pressure sensing pad group 10 and the touch sensing unit 2 can be electrically connected to the processing circuit Z22. The processing circuit Z22 can measure the second variations of the coupling capacitances through the touch sensing unit 2, and measure the first variation of the equivalent coupling capacitance through the pressure sensing pad group 10 so as to determine whether the button cap is touched or pressed.

Therefore, one of the advantages of the present disclosure is that in the pressure sensing unit, the capacitive hybrid sensor, and the input apparatus using the same provided herein, by the technical features of "a pressure sensing pad group including a first pressure sensing pad, a second pressure sensing pad, and a ground pad that are spaced apart from one another, in which the first pressure sensing pad and the second pressure sensing pad are electrically shielded from each other by the ground pad," "one of the floating conductive element and the pressure sensing pad group being configured to be movable in a movement direction relative to another one of the floating conductive element and the pressure sensing pad group" and "the floating conductive element overlapping with the pressure sensing pad group in the movement direction," a ratio of a press signal to noise can be improved to prevent erroneous detection.

Compared to the conventional capacitive sensing circuit, before the floating conductive element 11 is pressed, the effects, which results from the object approaching to the pressure sensing pad group 10, on the first variation of the equivalent coupling capacitance among the first pressure sensing pad 101, the second pressure sensing pad 102 and the floating conductive element 11 would be significantly attenuated. Accordingly, by arranging the ground pad 103 between the first pressure sensing pad 101 and the second pressure sensing pad 102, the undesired noise can be reduced, thereby improving a signal-to-noise ratio.

Furthermore, the capacitive hybrid sensor device Z10 (Z20) can be applied in any input apparatus, such as the input apparatus Z1, Z1' or the input apparatus Z2, so that the user can input commands by pressing or touching.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A pressure sensing unit for detecting pressing events comprising:
   a membrane having a first surface and a second surface opposite to the first surface; and
   a pressure sensing pad group including a first pressure sensing pad, a second pressure sensing pad, and a ground pad that are spaced apart from one another;
   wherein the ground pad and one among the first pressure sensing pad and the second pressure sensing pad are located at the first surface of the membrane, another one among the first pressure sensing pad and the second pressure sensing pad is located at the second surface of the membrane, and an orthographic projection of the ground pad projected onto a reference plane is located between orthographic projections of the first pressure sensing pad and the second pressure sensing pad that are projected onto the reference plane.

2. The pressure sensing unit according to claim 1, further comprising a floating conductive element, wherein the floating conductive element is configured to be movable in a movement direction, and the floating conductive element overlaps with the pressure sensing pad group in the movement direction.

3. The pressure sensing unit according to claim 2, wherein the floating conductive element overlaps with at least a part of the first pressure sensing pad in the movement direction to form a first capacitor, and the floating conductive element overlaps with at least a part of the second pressure sensing pad in the movement direction to form a second capacitor.

4. The pressure sensing unit according to claim 3, wherein an equivalent coupling capacitance among the floating conductive element, the first pressure sensing pad and the second pressure sensing pad is equal to a sum of the first capacitance and the second capacitance, and the first pressure sensing pad and the second pressure sensing pad are electrically shielded from each other by the ground pad.

5. The pressure sensing unit according to claim 4, wherein, in response to that the floating conductive element is pressed, a distance between the floating conductive element and the pressure sensing pad group becomes shorter, so as to change the equivalent coupling capacitance for determining the pressing events.

6. A pressure sensing unit for detecting pressing events comprising:
a membrane having a first surface and a second surface opposite to the first surface; and
a pressure sensing pad group including a first pressure sensing pad, a second pressure sensing pad, and a ground pad that are spaced apart from one another;
wherein the first pressure sensing pad, the second pressure sensing pad, and the ground pad are disposed at the first surface or the second surface, and an orthographic projection of the ground pad projected onto a reference plane is located between orthographic projections of the first pressure sensing pad and the second pressure sensing pad that are projected onto the reference plane.

7. The pressure sensing unit according to claim 6, further comprising a floating conductive element, wherein the floating conductive element is configured to be movable in a movement direction, and the floating conductive element overlaps with the pressure sensing pad group in the movement direction.

8. The pressure sensing unit according to claim 7, wherein the floating conductive element overlaps with at least a part of the first pressure sensing pad in the movement direction to form a first capacitor, and the floating conductive element overlaps with at least a part of the second pressure sensing pad in the movement direction to form a second capacitor.

9. The pressure sensing unit according to claim 8, wherein an equivalent coupling capacitance among the floating conductive element, the first pressure sensing pad and the second pressure sensing pad is equal to a sum of the first capacitance and the second capacitance, and the first pressure sensing pad and the second pressure sensing pad are electrically shielded from each other by the ground pad.

10. The pressure sensing unit according to claim 9, wherein, in response to that the floating conductive element is pressed, a distance between the floating conductive element and the pressure sensing pad group becomes shorter, so as to change the equivalent coupling capacitance for determining the pressing events.

* * * * *